(12) United States Patent
Morris et al.

(10) Patent No.: US 7,051,406 B1
(45) Date of Patent: May 30, 2006

(54) APPARATUS HOLDER FOR HATS

(75) Inventors: Russell Earl Morris, 650 Crescent Blvd., Southwest, Calgary, Alberta (CA) T2S 1L2; Gregory J. Collins, Loretto (CA)

(73) Assignee: Russell Earl Morris (CA)

( * ) Notice: Subject to any disclaimer, the term of this patent is extended or adjusted under 35 U.S.C. 154(b) by 0 days.

(21) Appl. No.: 10/757,004

(22) Filed: Jan. 14, 2004

Related U.S. Application Data

(60) Provisional application No. 60/440,269, filed on Jan. 15, 2003.

(51) Int. Cl.
*A44B 21/00* (2006.01)

(52) U.S. Cl. ............................................. 24/3.12; 2/10

(58) Field of Classification Search ................ 24/564, 24/336, 338, 3.12, 3.1; 2/10, 426
See application file for complete search history.

(56) References Cited

U.S. PATENT DOCUMENTS

| | | | | |
|---|---|---|---|---|
| 1,228,341 A | | 5/1917 | Maynard | 2/10 |
| 1,281,656 A | * | 10/1918 | Raschick | 24/3.12 |
| 1,514,111 A | | 11/1924 | Sutton | 2/10 |
| 2,519,959 A | | 8/1950 | Fisher | 2/10 |
| 2,560,669 A | | 7/1951 | Vaca | 2/10 |
| 2,691,164 A | | 10/1954 | Feldman | 2/10 |
| 2,871,538 A | * | 2/1959 | Richardson | 24/338 |
| 4,304,005 A | | 12/1981 | Danley | 2/10 |
| 4,541,125 A | | 9/1985 | Phillips | 2/10 |
| 4,819,274 A | | 4/1989 | Day | 2/10 |
| 5,129,102 A | | 7/1992 | Solo | 2/10 |
| 5,208,916 A | | 5/1993 | Kelman | 2/10 |
| 5,412,812 A | | 5/1995 | Gatchalian | 2/10 |
| 5,422,686 A | | 6/1995 | Kelman | 351/155 |
| 5,473,796 A | * | 12/1995 | Fusillo | 24/338 |
| 5,692,234 A | * | 12/1997 | Yuen | 2/10 |
| 5,829,103 A | * | 11/1998 | Allen | 24/3.12 |
| 5,867,874 A | * | 2/1999 | Simpson | 24/336 |
| 6,247,205 B1 | * | 6/2001 | Damadian et al. | 24/3.12 |
| 6,477,744 B1 | * | 11/2002 | Miles | 24/3.12 |
| 6,484,365 B1 | * | 11/2002 | Thompson | 24/3.12 |
| 6,691,374 B1 | * | 2/2004 | Coyne | 24/3.12 |

\* cited by examiner

*Primary Examiner*—Robert J. Sandy
(74) *Attorney, Agent, or Firm*—Buskop Law Group, P.C.; Wendy Buskop

(57) ABSTRACT

The apparatus for hands free holding of an article to hat has a substantially stiff lower clamp with a shape contoured to match a hat and two planar surfaces to provide grip support integral with the first planar surface, a substantially stiff upper clamp with engaging two arms integrally secured to the first planar surface, wherein the inner arm slides inside the crown with one side resting alongside the head of the user and the other side resting against the inside of the crown, and wherein the outer arm that is substantially parallel to the inner arm and spaced enough from the inner arm to attach removably to the crown; a spring fixedly secured to the base of the outer arm and extending away from the base substantially parallel to and to secure removably an article; and a soft outer clamp secured to the spring for additionally holding the article.

11 Claims, 4 Drawing Sheets

APPARATUS HOLDER FOR HATS

The present application claims priority to co-pending Provisional U.S. Patent Application Ser. No. 60/440,269 filed Jan. 15, 2003.

FIELD

Embodiments relates to an apparatus for hands free holding of an article to a hat.

BACKGROUND

Sunglasses or other eyeglasses that are attachable to a hat are known in the prior art.

U.S. Pat. No. 5,422,686 discloses an eyeglass assembly for visored headgear which includes an adjustable clip for attaching the eyeglasses to the visor. The distance between the clips is adjustable, enabling the user to vary the distance between the eyeglasses and the user's eyes. The attachment of the eyeglasses to the visor is relatively insecure. Also, the lens is fixed to posts on a hinge and is therefore not easily replaced.

In U.S. Pat. No. 5,129,102, a base having a pair of C-shaped clips is attached by VELCRO™ tape to the underside of the bill of a cap. A pair of ordinary sunglasses has cylindrical members that snap into the C-shaped clips to rotatably support the sunglasses. In another embodiment, the C-shaped clip is placed on the sunglasses themselves. The lens cannot be readily replaced without disassembling the hinge.

U.S. Pat. No. 4,304,005 discloses a pair of wire frames secured by VELCRO™ straps to the bill of a cap. A flat shield is pivotally mounted to the two wire frames to flip either in front of the wearer's face or up under the bill. The shield is slidably held by four small clips lacking any securing means. Being slidable, the position of the shield is relative to the hinge is highly variable. Also, while the shield is replaceable, its slidability leaves it prone to falling out of the clips. In the up position the shield apparently extends past the outer end of the bill.

U.S. Pat. No. 4,541,125 discloses a relatively long band having a pair of flat hooks that clip onto the bill of a cap. The center of the band has a bar which supports a C-shaped clip providing a hinge for a set of rotatable eyeglasses. The lens could not be readily replaced without disassembling this hinge. The eyeglasses curve to conform to the inner curved surface of a conventional cap visor. The eyeglasses have a projection that spaces the eyeglasses from the point of rotation. The glasses are mounted on the visor by means of a rigid clip having a hooked end portion into which the visor is received.

In U.S. Pat. No. 2,560,669, a T-shaped structure is riveted to the underside of a cap bill. A sheet of sunglass material is riveted to a hinge plate that is hinged to the structure riveted onto the bill. Thus the sunglass material cannot be readily replaced without disassembling the hinge. The hinge has an over center spring to snap the sunglasses into position. The sunglass material has a wrap around feature.

In U.S. Pat. No. 1,228,341, eye shield material is secured by indentations in a holder that is an integral part of a hinge. The holder is hinged to a pair of fingers that clip onto the tip of the bill of a cap. Interchangeable eye shields are not disclosed. Even if one attempted to defeat the indentations and replace the eye shield, there is no mechanism to properly position the shield relative to the hinge.

U.S. Pat. No. 1,514,111 discloses a wire band encircling the bill of a cap, with an eyeglass frame rotatably mounted to the wire beneath the bill. A pair of monocular eye pieces are suspended from a wire inserted through a hole in the eye piece frame. This form of suspension is unstable and will leave the eye pieces with a tendency to swing about the hole. See also U.S. Pat. No. 5,412,812 for another single point attachment with a narrow clip.

U.S. Pat. Nos. 2,519,959 and 2,691,164 both show a pair of clips supporting a ball to provide a ball joint connection to eye shields. Arms riveted to the eye shields form part of the ball joint. Thus, the eye shields cannot be readily replaced without disassembling the ball joint.

In U.S. Pat. No. 4,819,274 a lens is frictionally mounted in a U-shaped channel that has an integral hinge pin. This reference mentions removing the lens. Regardless, the U-shaped channel lacks any means for centering the lenses with respect to the hinges. Also see U.S. Pat. No. 5,208,916.

Thus, there is a need for an apparatus for hands free holding of an article, such as a pair of eyeglasses, sunglasses, a pencil, or other device which can be easily attached to and be retained on a baseball style cap, having a bill, additionally usable as an advertising device.

SUMMARY

The apparatus is directed towards hands-free holding of an article to a hat. The apparatus has a substantially stiff lower clamp for attaching to a hat that has a bill and a crown that covers the head of a user. The apparatus also has a substantially stiff upper clamp for gripping an article such as eyeglasses, sunglasses or other device. In the preferred embodiment, the substantially stiff lower clamp has a shape contoured to match the juncture of the bill with the crown and a first lower planar surface with serrated teeth designed to grip the underside of the cap bill. The apparatus also has an upper planar surface to provide grip support integral with the first planar surface. Preferably, the upper planar surface is oriented approximately parallel to the first planar surface and, combined with the upper planar surface and the lower planar surface, are situated to grip the bill of the cap firmly. The substantially stiff lower clamp is adapted to removably attach to the bill.

The substantially stiff upper clamp is designed to be secured integrally to the first planar surface and has a base engaging two arms. The inner arm slides inside the cap. The inner arm has a head side that rests along side the head and a hat side that rests along side the inner part of the cap. The outer arm is substantially parallel to the inner arm support in a spaced apart relationship from the inside support to removably attach to the crown at the hatband portion of the cap.

The outer arm has a soft outer cover and a smaller middle arm acting as a spring for fixedly attaching sunglasses or the like. The spring is fixedly secured to the outer arm and extends away from the arm substantially parallel to and in a spaced relationship from external side to removably secure an article.

BRIEF DESCRIPTION OF THE DRAWINGS

The present apparatus will be explained in greater detail with reference to the appended figures, in which.

The present apparatus is detailed below with reference to the listed Figures.

DETAILED DESCRIPTION OF THE PREFFERED EMBODIMENTS

Before explaining the present apparatus in detail, it is to be understood that the apparatus is not limited to the particular embodiments and that it can be practiced or carried out in various ways.

Figure 1:
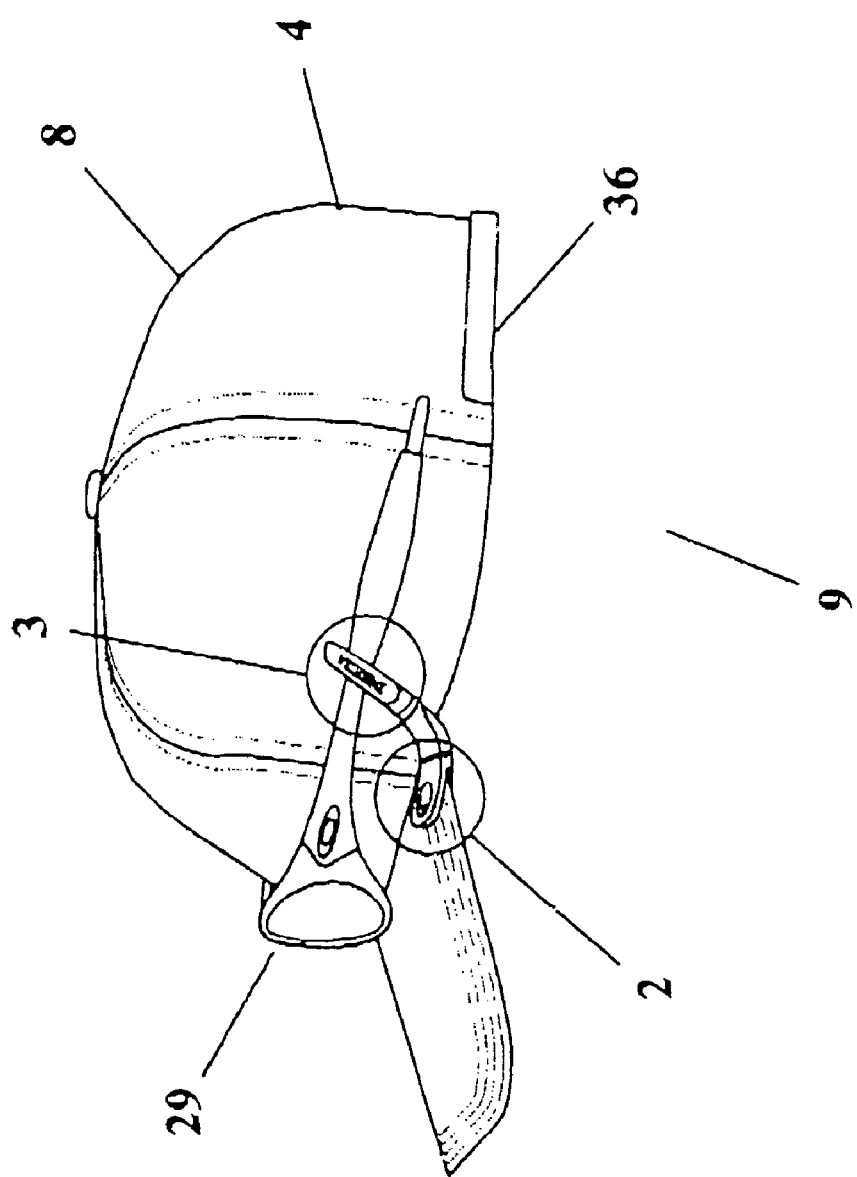
FIG. 1 depicts a perspective view of the cap with bill and holding apparatus.
Figure 2:
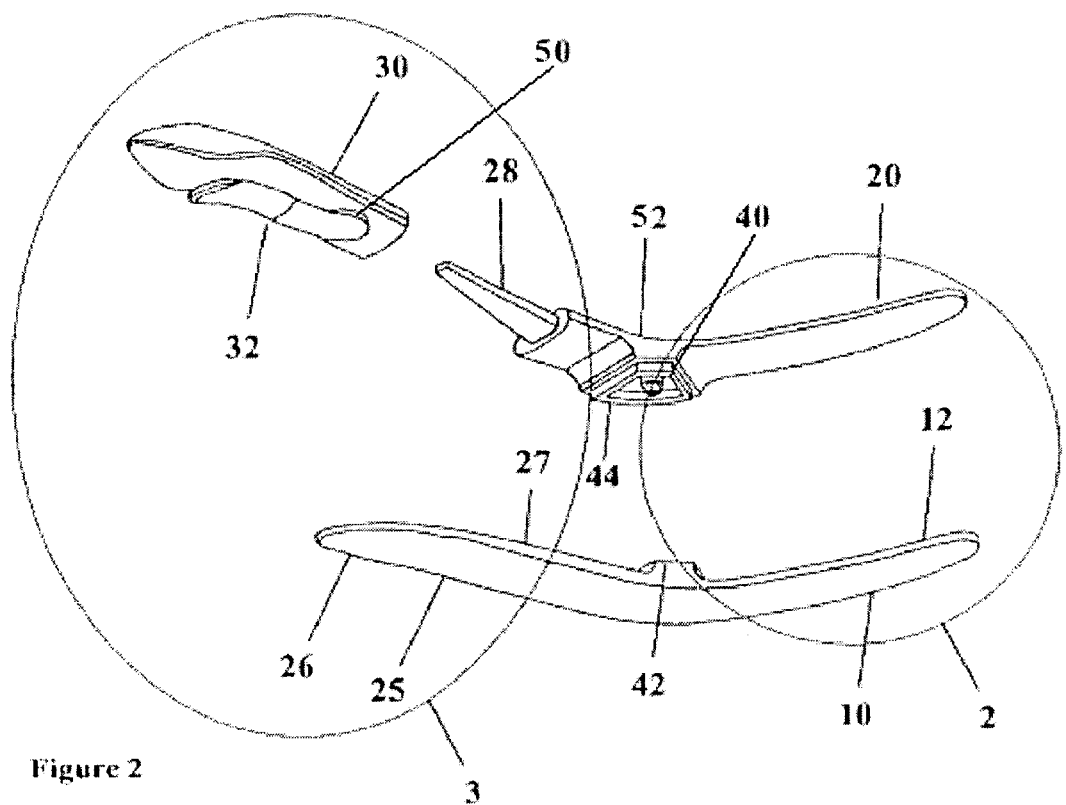
FIG. 2 depicts an exploded view of the clamp used in the apparatus.
Figure 3:
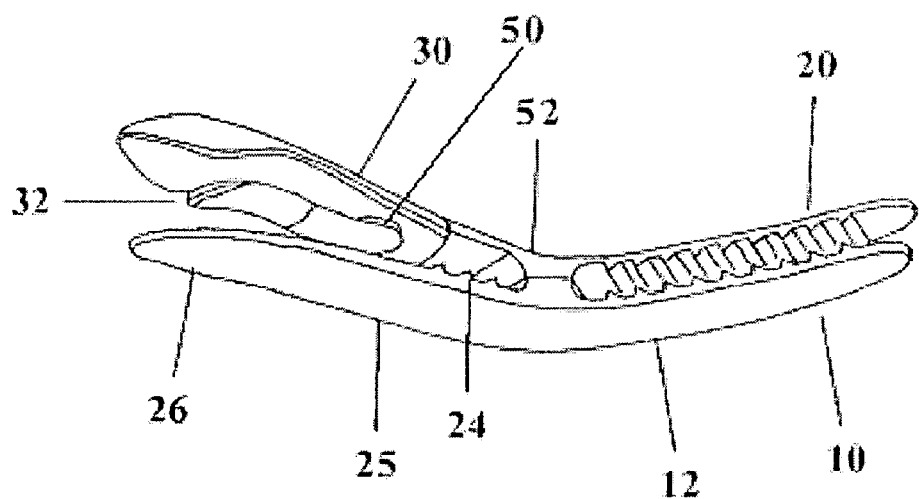
FIG. 3 depicts a rear view of the clamp used in the apparatus.
Figure 4:
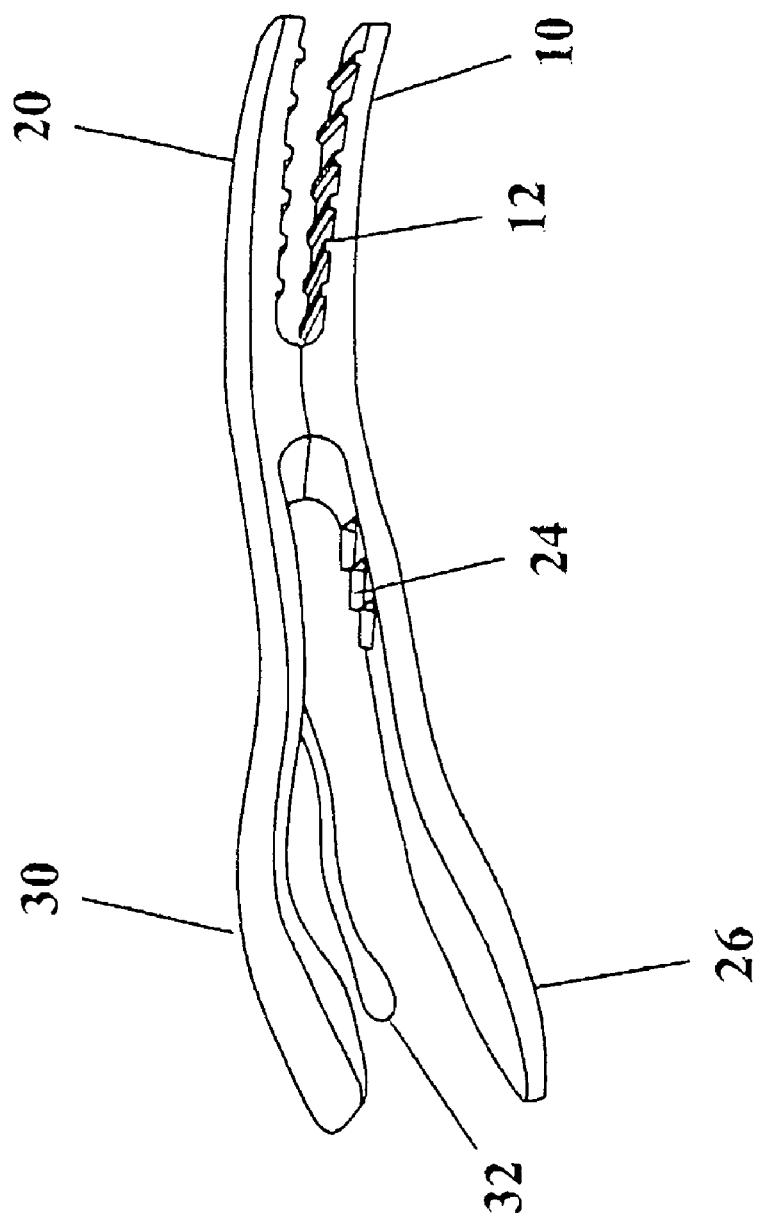
FIG. 4 depicts a front view of the clamp used in the apparatus.

In the presently preferred embodiment the invention relates to an apparatus for hands free holding of an article (29) on a hat (4) as shown in FIG. 1. The apparatus is shown in more detail in FIG. 2, FIG. 3 and FIG. 4.

The apparatus is made of a substantially stiff lower clamp assembly (2) and a substantially stiff upper clamp assembly (3). The stiff lower clamp assembly (2) has an inner arm (10) and an outer arm (20). The substantially stiff upper clamp assembly (3) has an inner arm (26) and an outer arm (28) with a soft outer cover (30) and inner spring (32).

By design, the upper and lower clamp assemblies (2 and 3) provide independent functions. The lower clamp assembly (2) grips the bill of the cap. The upper clamp assembly (3) grips both the hat band and crown of the cap as well as eyeglasses, sunglasses or device to be held in place by the clamp. These assemblies are held together by a mechanical connector (40).

The substantially stiff lower clamp assembly (2) is used to attach to a hat (4) that has a bill (6) and a crown (8) that covers the head (9) of a user. Preferably, the substantially stiff lower clamp has a shape to match the juncture of the bill with the crown. The substantially stiff lower clamp also has a first planar surface (10) with serrated teeth or other friction gripping mechanism either partially or entirely along the surface. The outside arm support is oriented approximately parallel to the first planar surface and, combined with the support arms form the substantially stiff lower clamp, grip a hat bill and also removably attach to the bill.

The lower clamp (2) can be made from a variety of materials including metal, coated metal, rigid plastic, urethane and combinations thereof.

The substantially stiff upper clamp assembly (3) also is for gripping the crown (8) of the cap (4) in the hatband area (36) holding in place an article such as sunglasses (29). Preferably, the substantially stiff upper clamp has a shape to match the contour of the crown of the cap and is secured to the lower clamp through integral design and a mechanical connection (40).

The substantially stiff upper clamp has an inner arm (26) integrally connected to, but separated from, an upper arm (28) by enough space for a cap hat band (36) to intercede. With reference to both FIG. 1 and FIG. 2, the inner arm (26) has a head side (25) and an inside hat band side (27) and is substantially parallel to the outside support (28) in a spaced apart relationship to attach removably to the crown.

The inside hat band surface (27) can have serrated teeth (24) or other friction gripping mechanism either partially or entirely along the surface. The outside support arm also has a soft cover and may or may not have a flexible spring (32) for gripping an external article. The upper clamp assembly (3) can be made from a variety of materials including metal, coated metal, rigid plastic, polyurethane and combinations thereof. The outside support arm cover can be made of soft rubber, plastic, foam, metal, coated metal or combinations thereof.

A spring (32), when assembled, is fixedly secured to a base (50) located on the soft outer clamp (30) and extending away from the base (52) and is substantially parallel to and creating a spaced relationship from the external side (30) to removably secure an article. In the most preferred embodiment, the spring is an integral plastic spring, but may also be a steel spring. In subsequent designs, the outer arm (28) and soft cover may be designed with sufficient flexibility and strength so as to eliminate the need for a spring middle arm (32) altogether.

The soft outer clamp (30) is secured to the spring (32) for additionally holding the article (29). The soft outer clamp (30) is made of a material that allows printing of various types of indicia or to which various types of indicia may be attached for advertising or promoting business. Examples of indicia are advertising by using trademarks, identifying marks, ornamental structure, designs, patterns, artistic representations and combinations thereof. The soft outer clamp (30) can also include a clear material, wherein the inner supporting arm (28) includes similar indicia.

In the most preferred embodiment, the inner planar surface (27) of the inner arms (10 and 26) of both clamp assemblies have a lower female connector (42) that engages an upper male mechanical connector (44). The upper male mechanical connector (44) is attached to the outer arms (20 and 28) of both clamp assemblies. The lower female connector (42) and the upper male connector (44) together comprise a rigid mechanical connection (40) that holds the outer and inner arms of the clamp assemblies together. The apparatus also contemplates that this connection can be a hinge to allow more flexible movement between the upper and lower clamps and between the inner and outer arms of the upper clamp.

In the present apparatus, the upper clamp has a curvilinear shape. Most preferably, the curvilinear shape of the inner arm (26) is the shape of the contour of a head and the curvilinear shape of the outer arm (28) with the outer cover attached is the shape of the contour of the hat.

The outer arm (20) at the base (52) of the lower clamp assembly (2) can include indicia and marking such as advertising using trademarks, identifying marks, ornamental structure, designs, patterns, artistic representations and combinations thereof. Alternatively, the soft outer clamp can also include similar type of indicia. The soft outer clamp can also include the clear material and the spring for indicia.

While this apparatus has been described with emphasis on the preferred embodiments, it should be understood that within the scope of the appended claims, the apparatus might be practiced other than as specifically described herein.

What is claimed is:

1. An apparatus for hands free holding of an article to a hat, comprising:
  a. a substantially stiff lower clamp for attaching to a hat comprising a bill and a crown that covers a head of a user, wherein the substantially stiff lower clamp comprises:
    i. a shape contoured to match the juncture of the bill with the crown; and
    ii. a first lower planar surface with serrated teeth designed to grip the underside of the bill and an upper planar surface to provide grip support integral with the first planar surface, also oriented approximately parallel to the first planar surface and adapted to removably attach to the bill;
  b. a substantially stiff upper clamp integrally secured to the first planar surface, and wherein the substantially stiff upper clamp comprises a base engaging two arms, wherein an inner arm of the two engaging arms slides inside the crown on one side for resting alongside the head of the user and the other side resting against the inside of the crown, wherein the inner arm of the two engaging arms comprises a surface that has serrated teeth to hold the hat and an outer arm of the two engaging arms that is substantially parallel to the inner arm and is in a spaced apart relationship to the inner arm to removably attach to the crown;

c. a spring fixedly secured to a spring base on the outer arm and extending away from the base substantially parallel to a soft outer clamp, wherein the spring is adapted to removably secure an article; and d. the soft outer clamp secured to a spring for additionally holding the article.

2. The apparatus of claim 1, wherein the lower clamp is a member of the group:

metal, coated metal, rigid plastic, urethane and combinations thereof.

3. The apparatus of claim 1, wherein the upper clamp is a member selected from the group consisting of metal, coated metal, rigid plastic, rubber, foam, polyurethane and combinations thereof.

4. The apparatus of claim 1, wherein the lower and upper clamps are adapted to attach to each side of the hat and hold an external device symmetrically.

5. The apparatus of claim 1, wherein the upper clamp comprises a curvilinear shape.

6. The apparatus of claim 1, wherein the spring is a plastic spring or a steel spring.

7. The apparatus of claim 1, wherein the soft outer clamp further comprises a cover.

8. The apparatus of claim 7, wherein the cover is made from a soft, foam-like material adapted to engage an external device.

9. The apparatus of claim 1, wherein the soft outer clamp includes indicia selected from the group consisting of advertising, trademarks, identifying marks, ornamental structure, designs, patterns and artistic representations.

10. The apparatus of claim 1, wherein the base includes indicia selected from the group consisting of advertising, trademarks, identifying marks, ornamental structure, designs, patterns and artistic representations.

11. The apparatus of claim 1, wherein the soft outer clamp consists of a clear material and the spring includes indicia selected from the group consisting of advertising, trademarks, identifying marks, ornamental structure, designs, patterns and artistic representations.

* * * * *